(12) United States Patent
Koziel et al.

(10) Patent No.: US 11,210,067 B1
(45) Date of Patent: Dec. 28, 2021

(54) ARCHITECTURE FOR SMALL AND EFFICIENT MODULAR MULTIPLICATION USING CARRY-SAVE ADDERS

(71) Applicant: PQSecure Technologies, LLC, Boca Raton, FL (US)

(72) Inventors: Brian Craig Koziel, Plano, TX (US); Rami El Khatib, Boca Raton, FL (US)

(73) Assignee: PQSecure Technologies, LLC, Boca Raton, FL (US)

( * ) Notice: Subject to any disclaimer, the term of this patent is extended or adjusted under 35 U.S.C. 154(b) by 0 days.

(21) Appl. No.: 17/285,168

(22) PCT Filed: Nov. 27, 2020

(86) PCT No.: PCT/US2020/062523
§ 371 (c)(1),
(2) Date: Apr. 14, 2021

(51) Int. Cl.
*G06F 7/72* (2006.01)
*G06F 7/501* (2006.01)

(52) U.S. Cl.
CPC .............. *G06F 7/728* (2013.01); *G06F 7/501* (2013.01)

(58) Field of Classification Search
CPC . G06F 7/501; G06F 7/72; G06F 7/722; G06F 7/728
See application file for complete search history.

(56) References Cited

U.S. PATENT DOCUMENTS

| | | | |
|---|---|---|---|
| 6,185,596 B1 | 2/2001 | Hadad et al. | |
| 2002/0010730 A1 | 1/2002 | Blaker | |
| 2004/0179681 A1 | 9/2004 | Lee et al. | |
| 2004/0215686 A1 | 10/2004 | Yoon et al. | |
| 2011/0225220 A1* | 9/2011 | Huang | G06F 7/728 708/207 |
| 2013/0246495 A1 | 9/2013 | Svore et al. | |

OTHER PUBLICATIONS

A.A Hiasat, A Suggestion for a Fast Residue Multiplier for a Family of Moduli of the Form (2n-(2p +/- 1)), The Computer Journal, 47(1), The British Society, 2003 (Year: 2003).*
YJ Jeong et al., VLSI Array Algorithms and Architectures for RSA Modular Multiplication, IEEE Transactions on Very Large Scale Integration (VLSI) Systems, vol. 5, No. 2, 1997 (Year: 1997).*

* cited by examiner

*Primary Examiner* — Emily E Larocque
(74) *Attorney, Agent, or Firm* — Mark C. Johnson; Johnson Dalal

(57) ABSTRACT

A computer processing system having at least one accelerator operably configured to compute modular multiplication with a modulus of special form and having a systolic carry-save architecture configured to implement Montgomery multiplication and reduction and having multiple processing element types composed of Full Adders and AND gates.

9 Claims, 17 Drawing Sheets

ARCHITECTURE FOR SMALL AND EFFICIENT MODULAR MULTIPLICATION USING CARRY-SAVE ADDERS

FIELD OF THE INVENTION

The present invention relates generally to hardware, systems, implementation and methods directed towards modular multiplication using carry-save adders over modulus of a special shape, and, more particularly, relates to performing modular multiplication quickly and with as few carry-save adders as possible.

BACKGROUND OF THE INVENTION

Modular arithmetic is a system of arithmetic for integers, where numbers that reach a certain value called the modulus are set back to the identity value (usually 0). Modular arithmetic is one of the foundations of number theory, studied extensively by mathematicians and is used heavily in cryptography and other applications.

Modular addition/subtraction (a±b mod m) and modular multiplication (a×b mod m) are the primary operations in modular arithmetic. While modular multiplication with an exponent of 2 modulus is cheap in a computer system as it involves simple bit shifts, modular multiplication with a modulus that is not an exponent of 2 requires additional work in computer systems. Therefore, it would be desirable to provide an efficient modular multiplication.

---

Algorithm 1: Montgomery Multiplication

Input: a, b, m < $2^K$, R = $2^k$, m' = $-m^{-1}$ mod m
Output: a × b × $R^{-1}$ mod m
Begin
1. T = a × b
2. q = T × m' mod R
3. T = T + q × m
4. T = T/R
5. if T > m return T − m else return T
end

---

A common method is to use Montgomery multiplication. The Montgomery multiplication method converts the expensive division by the modulus that is not an exponent of 2, to a cheap division by an exponent of 2. Montgomery multiplication, as shown in Algorithm 1, performs the operation a×b×$R^{-1}$ mod m and is composed of two steps; a multiplication step (1) and a reduction step (2-4). The multiplication step performs the multiplication of the two operands T=a×b while the reduction step performs T×$R^{-1}$ mod m. The reduction step involves three steps where the first step is to compute a quotient q, the second step is to compute T+q×m, and the third step is to divide by R. Finally, a subtraction (5) is performed if the result is greater than m.

When implementing modular multiplication in hardware or software-based systems, performing the multiplication or addition steps in Algorithm 1 with the least complexity is necessary to make an implementation as efficient as possible. Depending on the application, certain assumptions can be made based on the shape of the inputs or modulus.

One direct application of efficient implementations is the need to secure communications between two parties by using cryptography. This innovation focuses on moduli of the forms $f \cdot 2^e - 1$ and $f \cdot 2^e + 1$, where f is a constant integer and e is a constant integer greater than 2. Notably, this shape of prime has been used in isogeny-based cryptosystems, such as, but not limited to, the supersingular isogeny Diffie-Hellman key exchange protocol (SIDH) and the supersingular isogeny key encapsulation mechanism (SIKE).

To implement the Montgomery multiplier as is shown in Algorithm 1, a small radix or small digit approach is recommended as the quotient and computation is simplified and the multiplication and reduction steps can be parallelized. In addition, a carry-save adder (CSA) approach can be used to reduce the critical path delay of an implementation that utilizes hardware transistor gates. However, the generic CSA approach does not optimally utilize hardware or software resources for primes of the above type.

Therefore, a need exists to overcome the problems with the prior art as discussed above.

SUMMARY OF THE INVENTION

Here, we define an "efficient" implementation of a modular multiplication in a computer system as one that performs the modular multiplication in fewer gates, smaller critical path delay, or fewer total operations than the state-of-the-art.

Montgomery multiplication is used as the basis for the modular multiplication for both moduli. The invention uses a similar carry-save adder (CSA) approach to the one found in the disclosure of Sutter et al., Modular Multiplication and Exponentiation Architectures for Fast RSA Cryptosystem Based on Digit Serial Computation (July 2011). However, unlike the prior art, the approach performs an additional optimization that targets moduli of the forms $f \cdot 2^e - 1$ and $f \cdot 2^e + 1$, where f is a constant integer and e is a constant integer greater than 2. Therefore, we here claim the patent on the modification.

The invention provides a hardware, system, implementation, and method for efficiently implementing low complexity modular multiplication bit-by-bit with modulus m of the form $f \cdot 2^e - 1$ where f is a constant integer and e is a constant integer greater than 2. The modulus m is k bits long.

With the foregoing and other objects in view, there is provided, in accordance with the invention, a computer processing system for reducing the processing footprint in modular multiplication systems utilizing a systolic architecture for performing Montgomery multiplication where partial products are generated from a combination of Full Adder and AND gate operations by using carry-save adder arithmetic. In this systolic architecture, the least significant e processing elements of the systolic architecture are composed of a single Full Adder and single AND gate while the next significant k−e processing elements are composed of two Full Adders and two AND gates.

In accordance with the above, there is additionally a Montgomery quotient q value computation that requires two XOR gates, one Full Adder, and three AND gates.

In accordance with the above, this innovation applies to, but is not limited to, implementations accelerating bit-based modular multiplication with the following moduli: m=$2^{216}3^{137}-1$  m=$2^{250}3^{259}-1$, m=$2^{305}3^{192}-1$, or m=$2^{372}3^{239}-1$.

Additionally, in accordance with a further feature of the present invention, an arbitrary digit d is selected such that modular multiplication can be performed digit-by-digit with modulus m of the form $f \cdot 2^e - 1$ where f is a constant integer and e is a constant integer greater than 2. The modulus m is k bits long. When the digit d is 1, this is the same as the previous paragraph. In this systolic architecture, the least significant CEILING(e/d) processing elements are composed of d Full Adders and d AND gates while the next significant CEILING((k−e)/d) processing elements are composed of 2·d Full Adders and 2·d AND gates. The next "q" value computation requires 2·d XOR gates, d Full Adders, and 3·d AND gates.

In accordance with the above, there is additionally a Montgomery quotient q value computation that requires 2·d XOR gates, d Full Adders, and 3·d AND gates.

In accordance with the above, this innovation applies to, but is not limited to, implementations accelerating digit-based modular multiplication with the following moduli: $m=2^{216}3^{137}-1$, $m=2^{250}3^{259}-1$, $m=2^{305}3^{192}-1$, or $m=2^{372}3^{239}-1$.

The invention provides a hardware, system, implementation, and method for efficiently implementing low area modular multiplication bit-by-bit with modulus m of the form $f \cdot 2^e+1$ where f is a constant integer and e is a constant integer greater than 2. m is k bits long.

With the foregoing and other objects in view, there is provided, in accordance with the invention, a computer processing system for reducing the processing footprint in modular multiplication systems utilizing a systolic architecture where partial products are generated from a combination of Full Adder and AND gate operations by using carry-save adder arithmetic. A "carry-in" bit is stored to simplify computations. In this systolic architecture, the least significant processing element is composed of two Full Adders and a single AND gate. The next more significant e−1 processing elements are composed of only one Full Adder and one AND gate. The most significant k−e processing elements are composed of two Full Adders and two AND gates.

Additionally, in accordance with a further feature of the present invention, an arbitrary digit d is selected such that modular multiplication can be performed digit-by-digit with modulus m of the form $f \cdot 2^e-1$ where f is a constant integer and e is a constant integer greater than 2. The modulus m is k bits long. When the digit d is 1, this is the same as the previous paragraph. In this systolic architecture, the least significant CEILING(e/d) processing elements are composed of d Full Adders and d AND gates while the next significant CEILING((k−e)/d) processing elements are composed of 2·d Full Adders and 2·d AND gates. The next "q" value computation requires 2·d XOR gates, d Full Adders, and 3·d AND gates. Arbitrary digit d is selected such that modular multiplication can be performed digit-by-digit with modulus m of the form $f \cdot 2^e+1$ where f is a constant integer and e is a constant integer greater than 2. The modulus m is k bits long. When the digit d is 1, this is the same as the previous paragraph. In this systolic architecture, the least significant processing element is composed of 2·d Full Adders and d AND gates. The next significant CEILING ((k−e−1) d) processing elements are composed of one Full Adder and one AND gate. The next significant CEILING ((k−e)/d) processing elements are composed of two Full Adders and two AND gates.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms.

Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Therefore, in accordance with one embodiment of the present invention, a computer processing system is disclosed that includes at least one accelerator operably configured to compute modular multiplication with a modulus of the form, $m=f \cdot 2^e-1$, wherein f is any integer, e is any integer greater than 2, and m is k bits long and have a systolic carry-save architecture configured to implement Montgomery multiplication and reduction bit-by-bit, has a processing element for the e least significant bits that are composed of one Full Adder and one AND gate, and a processing element for the next significant k−e bits composed of two Full Adders and two AND gates.

In accordance with a further embodiment, the Montgomery multiplication includes a logical bit, q, computed by one Full Adder, two XOR gates, and three AND gates, wherein the q is operably configured to be stored and implemented in the processing element for the most significant k−e bits.

In accordance with an additional embodiment, the q is operably configured to be stored in the systolic carry-save architecture. Further, the modulus may be $m=2^{216}3^{137}-1$, $m=2^{250}3^{259}-1$, $m=2^{305}3^{192}-1$, or $m=2^{372}3^{239}-1$.

Also in accordance with the present invention, an embodiment of the present invention includes at least one accelerator operably configured to compute modular multiplication digit-by-digit with a modulus of the form, $m=f \cdot 2^e-1$, wherein f is any integer, e is any integer greater than 2, m is k bits long, and a digit, d, is any integer greater than 1 and to have a systolic carry-save architecture configured to implement Montgomery multiplication and reduction digit-by-digit, has a processing element for the CEILING(e/d) least significant digits that are composed of d Full Adders and d AND gates, and a processing element for the next significant CEILING((k−e)/d) digits composed of 2·d Full Adders and 2·d AND gates.

Also in accordance with the present invention, an embodiment of the present invention includes a computer processing system having at least one accelerator operably configured to compute modular multiplication with a modulus of the form, $m=f \cdot 2^e+1$, wherein f is any integer, e is any integer greater than 2, and m is k bits long and to have a systolic carry-save architecture configured to implement Montgomery multiplication and reduction bit-by-bit, has a processing element for the least significant bit that is composed of two Full Adders and one AND gate, has a processing element for the next significant e−1 bits that are composed of one Full Adder and one AND gate, and a processing element for the next significant k−e bits composed of two Full Adders and two AND gates.

Also in accordance with the present invention, an embodiment of the present invention includes a computer processing system having at least one accelerator operably configured to compute modular multiplication digit-by-digit with a modulus of the form, $m=f \cdot 2^e+1$, wherein f is any integer, e is any integer greater than 2, m is k bits long, and a digit, d, is any integer greater than 1 and to have a systolic carry-save architecture configured to implement Montgomery multiplication and reduction digit-by-digit, has a processing element for the least significant digit that is composed of 2·d Full Adders and d AND gates, has a processing element for the CEILING((e−1)/d) for the next significant digits that are composed of d Full Adders and d AND gates, and a processing element for the next significant CEILING ((k−e+1)/d) digits composed of 2·d Full Adders and 2·d AND gates.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. In this document, the term "longitudinal" should be understood to mean in a direction corresponding to an elongated direction of any processing chip. The terms "program," "software application," and the like as used herein, are defined as a sequence of instructions designed for execution on a computer system. A "program," "computer program," or "software application" may include a subroutine, a function, a procedure, an object method, an object implementation, an executable application, an applet, a servlet, a source code, an object code, a shared library/ dynamic load library and/or other sequence of instructions designed for execution on a computer system.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

In general, these are drawn in a digital hardware design fashion. Each letter or line represents a single bit, or value between '0' and '1' to represent a digital circuit off or on, respectively. These diagrams compute modular multiplication, or a*b mod m using the Montgomery multiplication method as is shown in Algorithm 1. a represents input 1, b represents input 2, m represents the modulus, and p represents intermediate results. Subscripts s and c refer to carry-save adder notations sum and carry, respectively. q refers to a special quotient value that is unique to Montgomery multiplication. An AND gate is represented by half an ellipsoid, which is set if both inputs are set, similar to a simple multiplication. An XOR gate result is set if exactly one input is set.

FA stands for Full Adder, which in carry-save adder circuits, computes s a XOR b XOR c_in and c_out (a AND b) OR (cin AND (a XOR b)). Here, a, b, and c_in are inputs and s and c_out are outputs. All gates and Full Adder computations can be performed on a variety of software computer processors and hardware transistors.

Figure 1A:
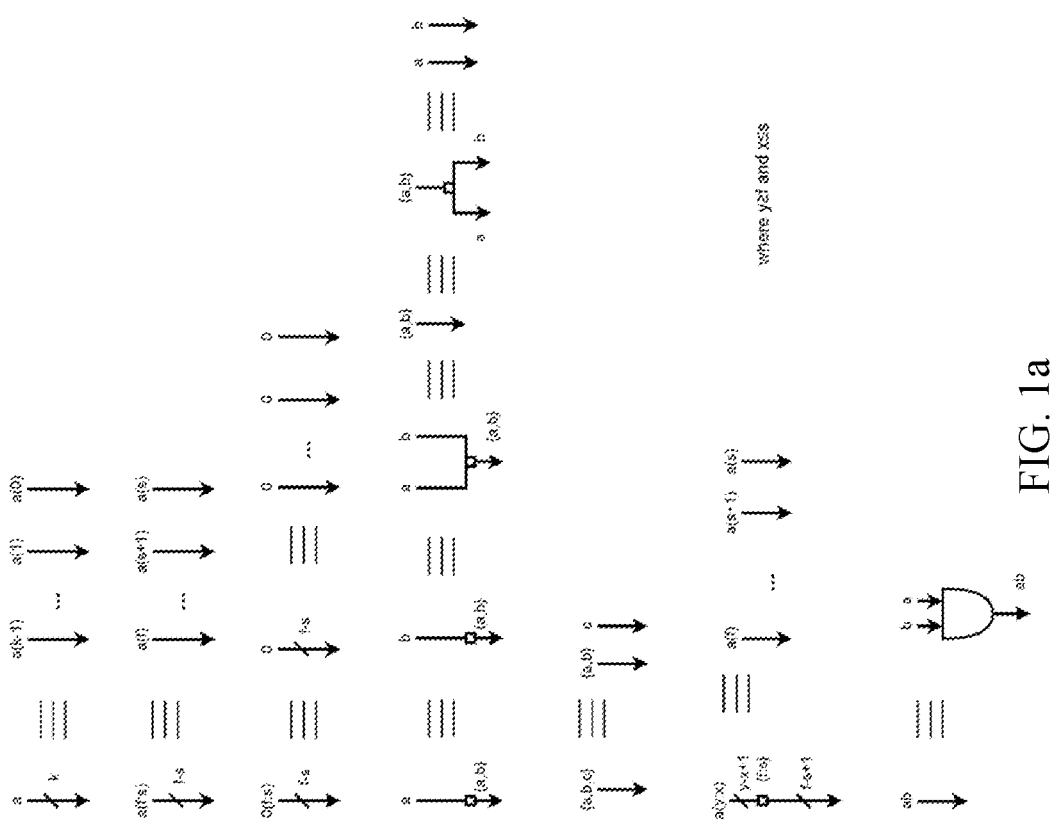
Figure 1B:
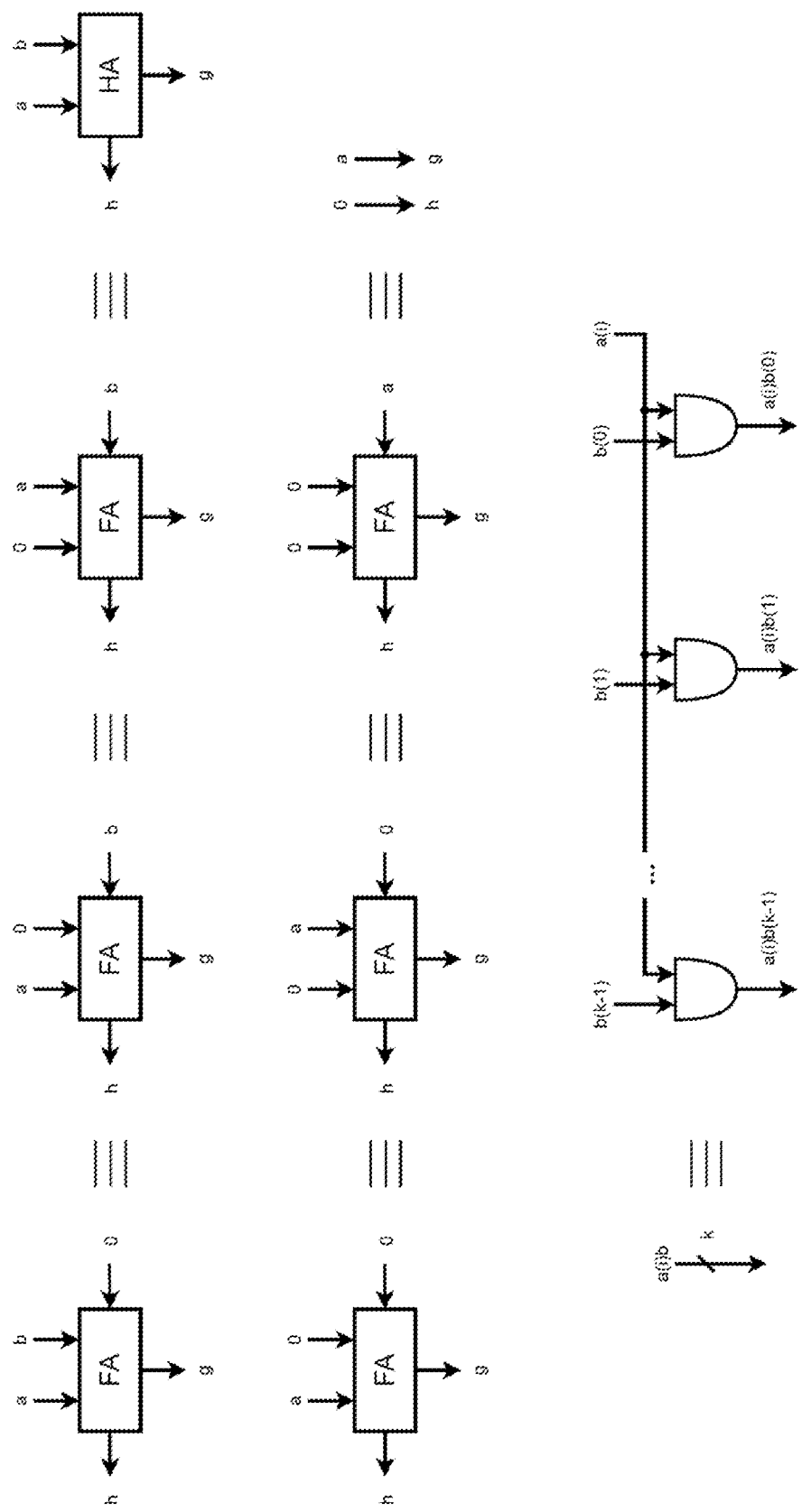
Figure 1C:
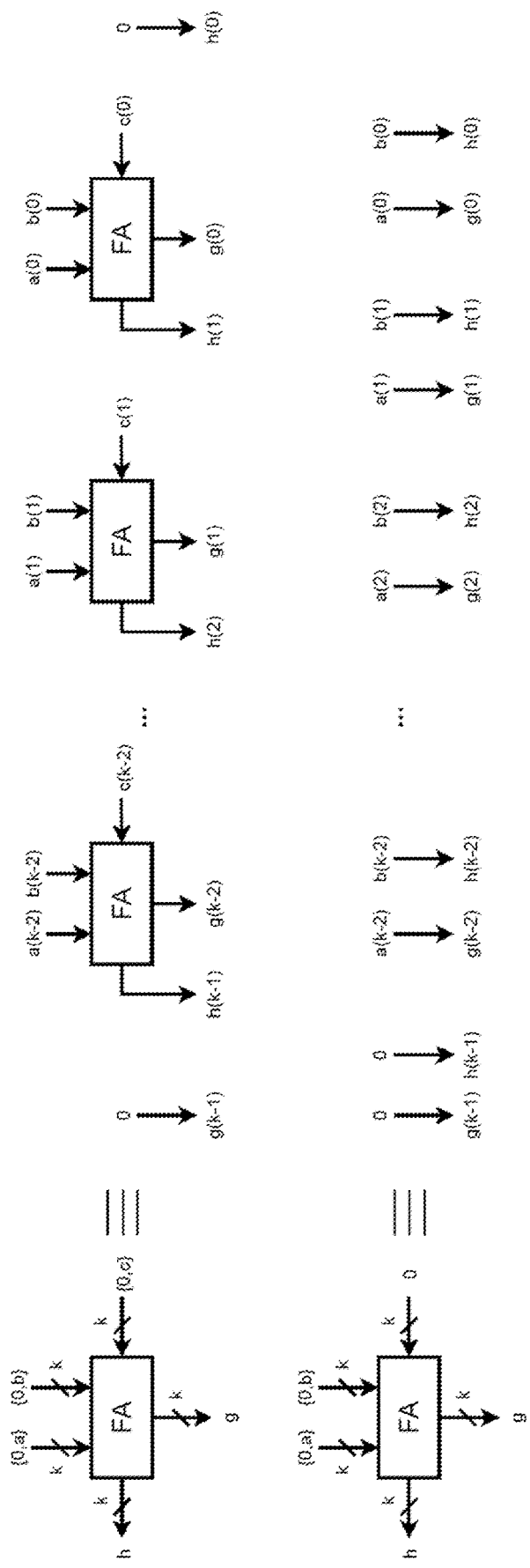

FIGS. 1a-c are a reference for digital hardware notation. Since there are many ways to trivially rearrange inputs and outputs for a functionally equivalent circuit, we show multiple equivalent representations. The first row shows wire set a that is k total wires arranged from most significant wire (a(k−1)) to least significant wire (a(0)).

The second row shows a concatenation of bits or wires (depending on the application) that represent input a(f:s). Each wire is given a label with respect to the value a. There are f−s wires here, with the order a(f:s), f represents the most significant bit or wire and s represents the least significant bit or wire. In the third row, we use the notation 0(f:s) to represent a f−s set of wires that are all logical value '0'. In the fourth row, we represent a concatenation of wire a and wire b with a small concatenation box. In the fifth row, we represent three wires {a,b,c} as a single wire, but this is equivalent the three wires in any orientation. In the sixth row, we perform a subset operation, by taking the smaller or equivalent set of wires a(fs) from the larger or equivalent set of wires a(y,x). In the seventh row, we illustrate the AND operation as either ab or with two inputs a and b pushed through an AND gate. In the eighth row, we illustrate a Full Adder gate with two inputs and two outputs. Since one input is '0', this is functionally equivalent to a Half Adder gate. In the ninth row, we illustrate a Full Adder gate with one input and two outputs, which essentially feeds the value through. In the tenth row, we show a series of AND gates. Each wire of wire set b is pushed through an AND gate with wire a(i). Lastly, in the eleventh row, we show a series of Full Adders with inputs a, b, and c, and outputs g and h. There are k such wires in each input and output and k−1 total Full Adders.

Figure 2:
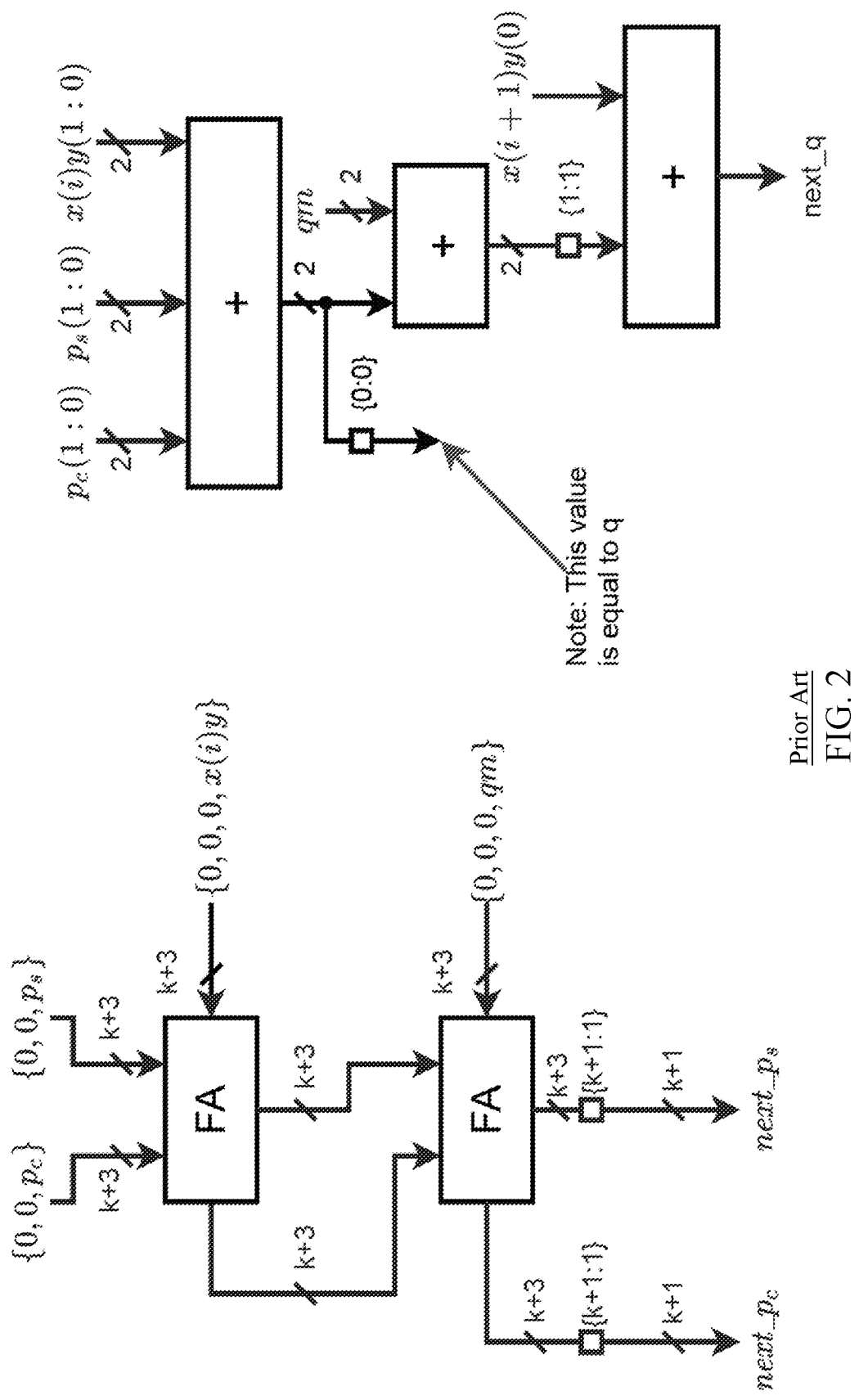

FIG. 2 is a schematic diagram depicting the systolic architecture to perform Montgomery multiplier with digit d=1 over some modulus. This represents the prior approach for carry-save adders. In the systolic architecture on the left side, there are 2k−1 Full Adders and 2k AND gates. The right side shows how to compute the next Montgomery quotient value q.

Figure 3:
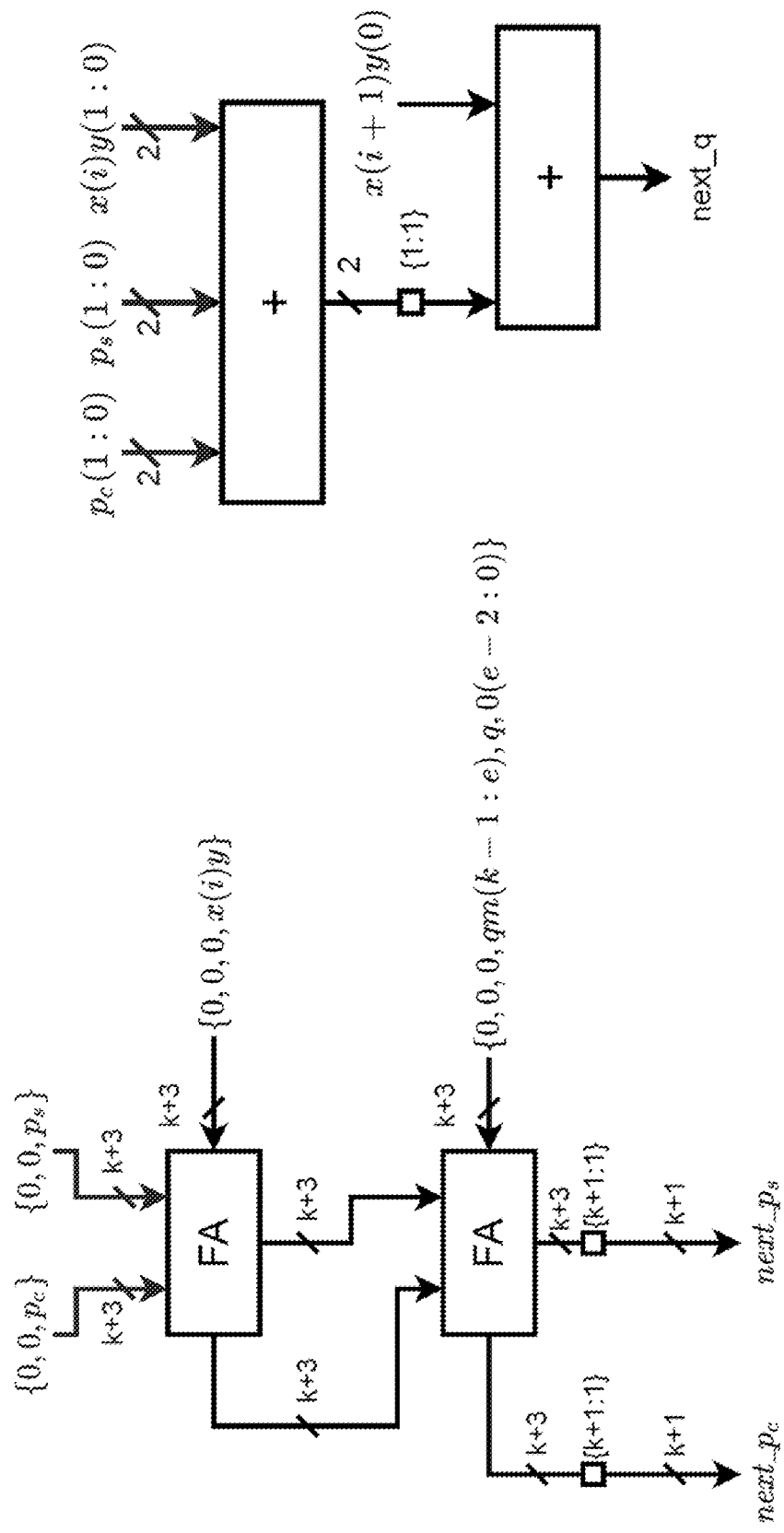

FIG. 3 is a schematic diagram that depicts the connections for a processing unit for the invention's Montgomery multiplier with modulus=f·2$^e$−1 and digit d=1. This systolic architecture Montgomery multiplier on the left uses e fewer AND gates and e fewer Full Adders than the prior art. Note that the order of Full Adder, AND gates, or inputs/outputs can be swapped around a variety of ways and still be functionally identical. Additionally, note that designs using specific moduli can further simplify the Full Adders based on bits of the modulus. The right side utilizes two fewer Full Adders and two fewer AND gates than the prior art and has a smaller critical path from input to output.

Figure 4:
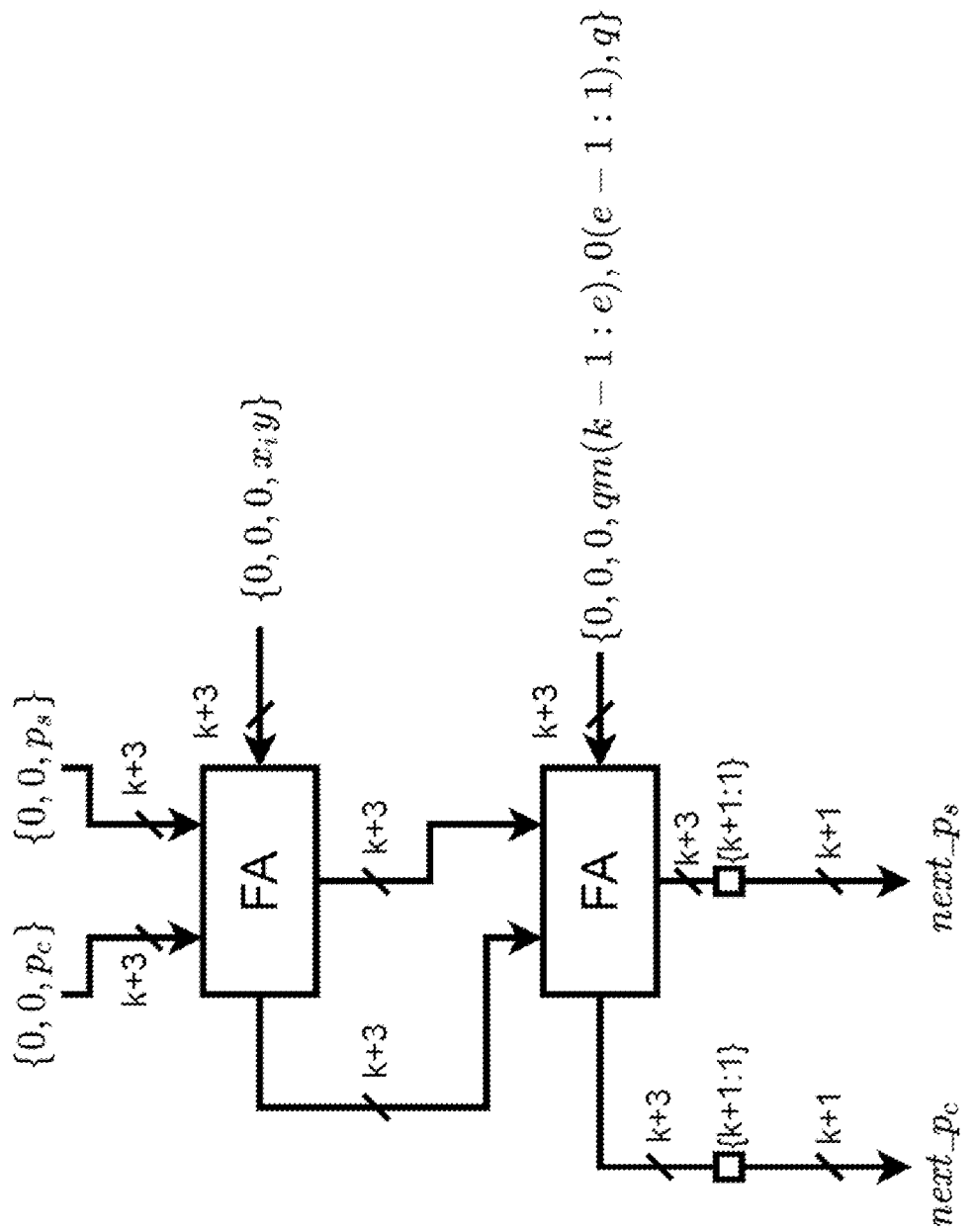

FIG. 4 is a schematic diagram that depicts the connections for a processing unit for the invention's Montgomery multiplier with modulus=f·2$^e$+1 and digit d=1. This Montgomery multiplier uses e fewer AND gates and e fewer Full Adders than the prior art. Note that the order of Full Adder, AND gates, or inputs/outputs can be swapped around a variety of ways and still be functionally identical. Additionally, note that designs using specific moduli can further simplify the Full Adders based on bits of the modulus. The next q circuit is the same as FIG. 2.

Figure 5A:
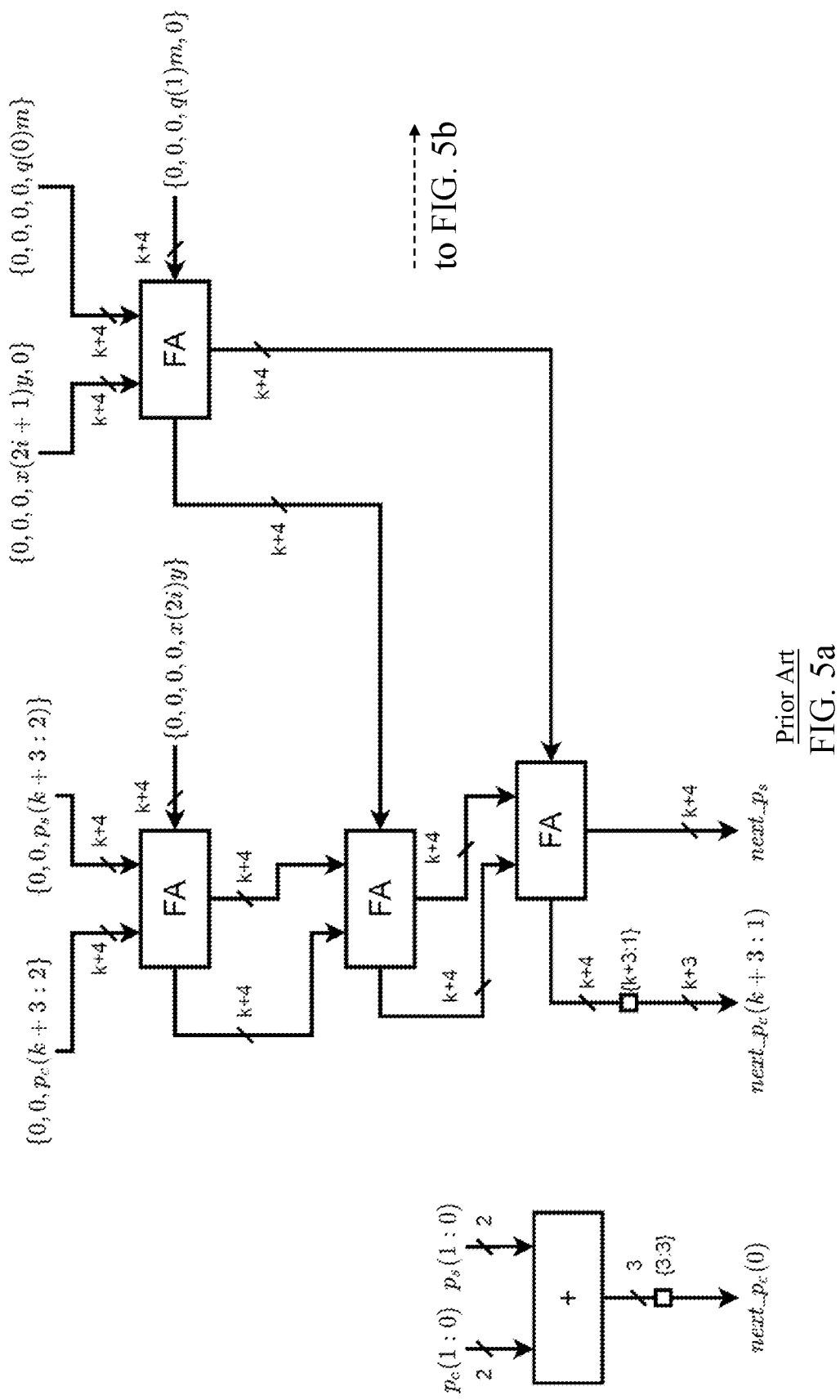
Figure 5B:
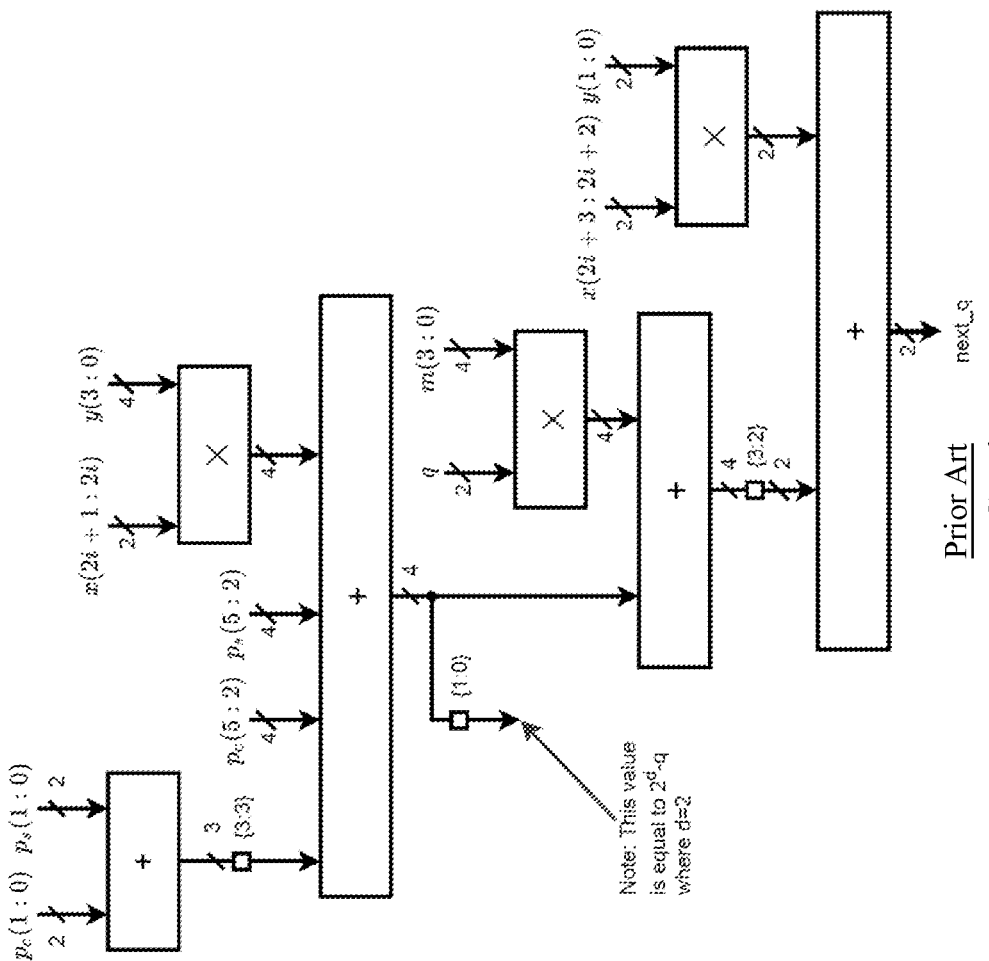

FIGS. 5a-b are a schematic diagram depicting the systolic architecture to perform Montgomery multiplier with digit d=2 over some modulus. This represents the prior approach for Montgomery multiplication using carry-save adders. Many different arrangements of the Full Adders can be achieved for a functionally equivalent system.

Figure 6A:
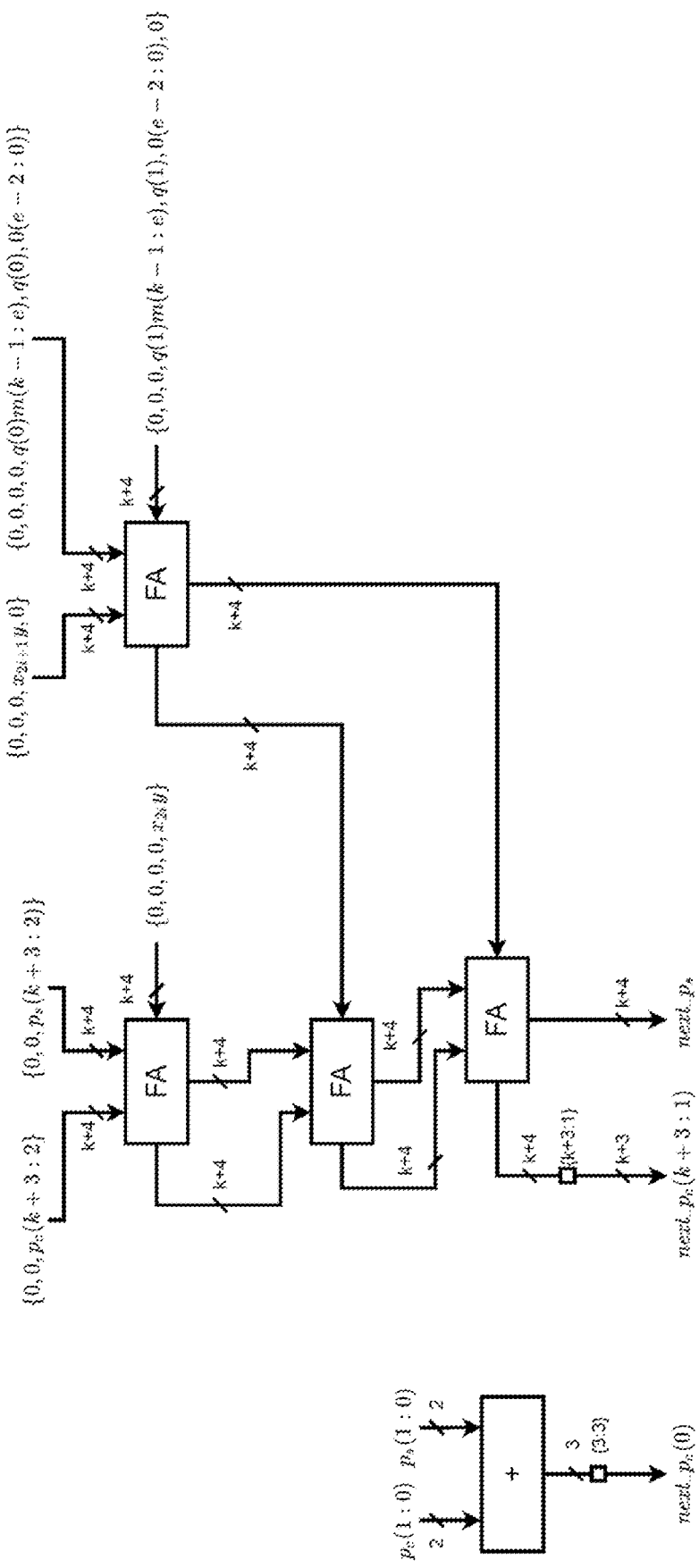
Figure 6B:
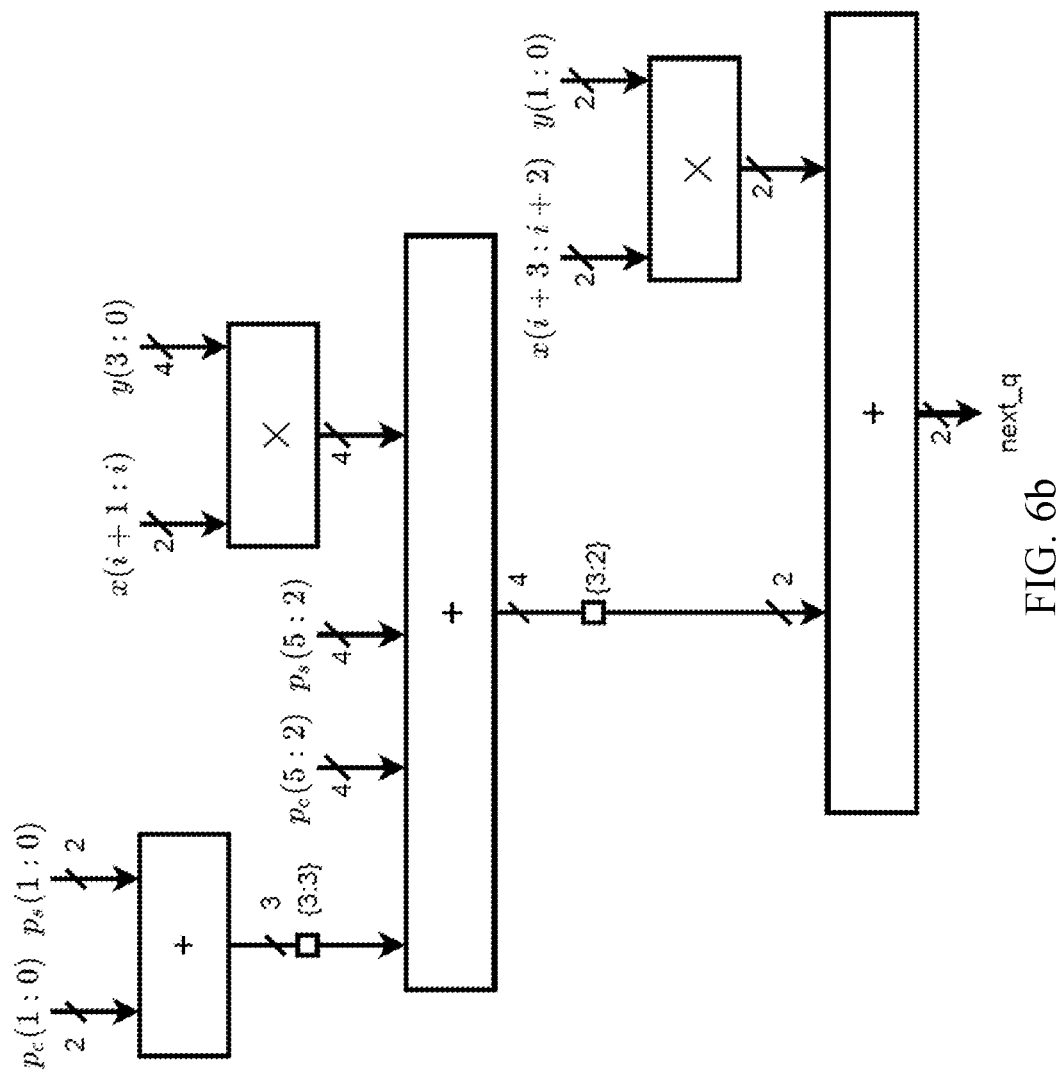

FIGS. 6a-b is a schematic diagram that depicts the connections for a processing unit for the invention's Montgomery multiplier with modulus=f·2$^e$−1 and digit d=2. This Montgomery multiplier uses 2·e fewer AND gates and 2·e fewer Full Adders than the prior art. Note that the order of Full Adder, AND gates, or inputs/outputs can be swapped around a variety of ways and still be functionally identical. Additionally, note that designs using specific moduli can further simplify the Full Adders based on bits of the modulus.

Figure 7:
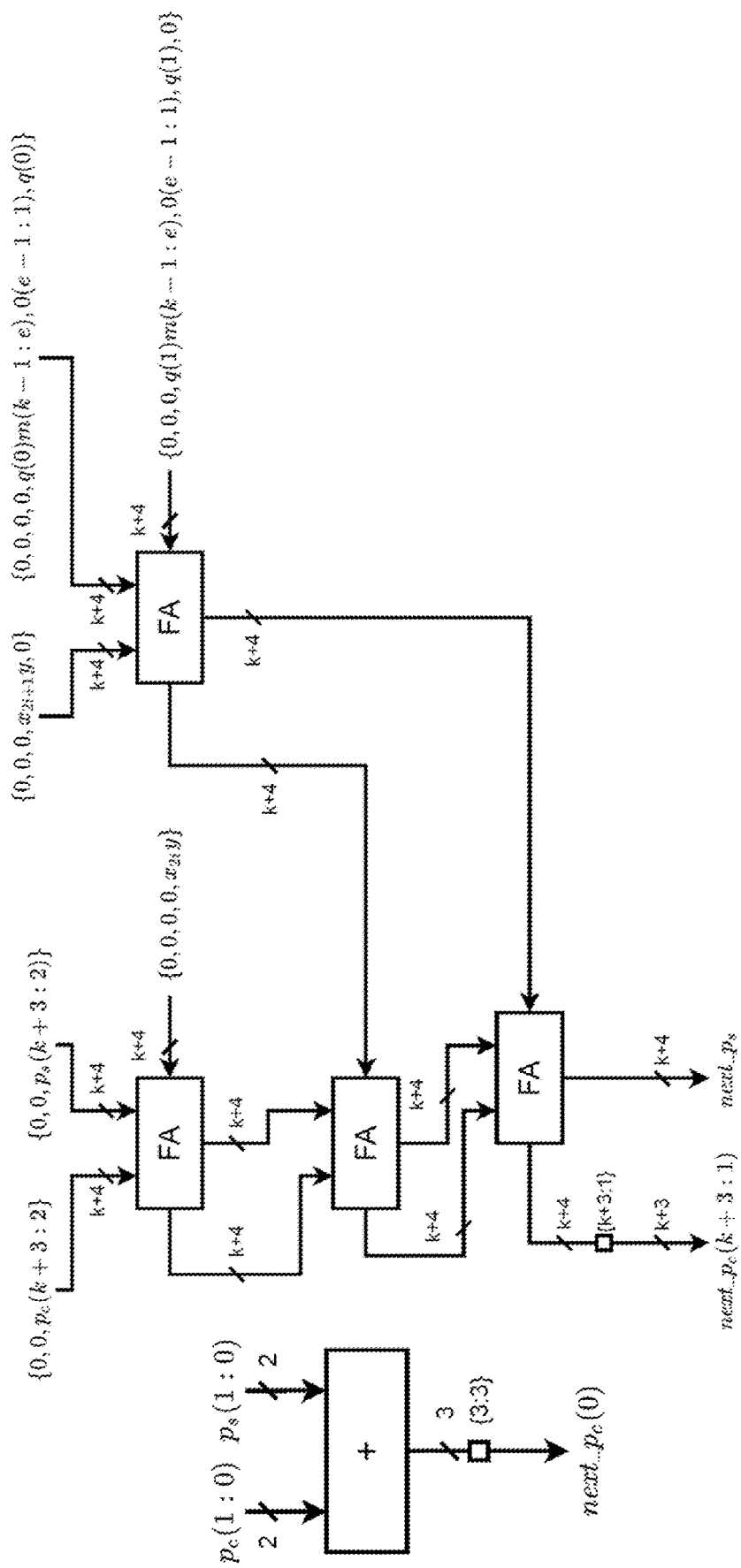

FIG. 7 is a schematic diagram that depicts the connections for a processing unit for the invention's Montgomery multiplier with modulus=f·$2^e$+1 and digit d=2. This Montgomery multiplier uses 2e fewer AND gates and 2e fewer Full Adders than the prior art. Note that the order of Full Adder, AND gates, or inputs/outputs can be swapped around a variety of ways and still be functionally identical. Additionally, note that designs using specific moduli can further simplify the Full Adders based on bits of the modulus. The next q circuit is the same as FIGS. 5a-b.

Figure 8A:
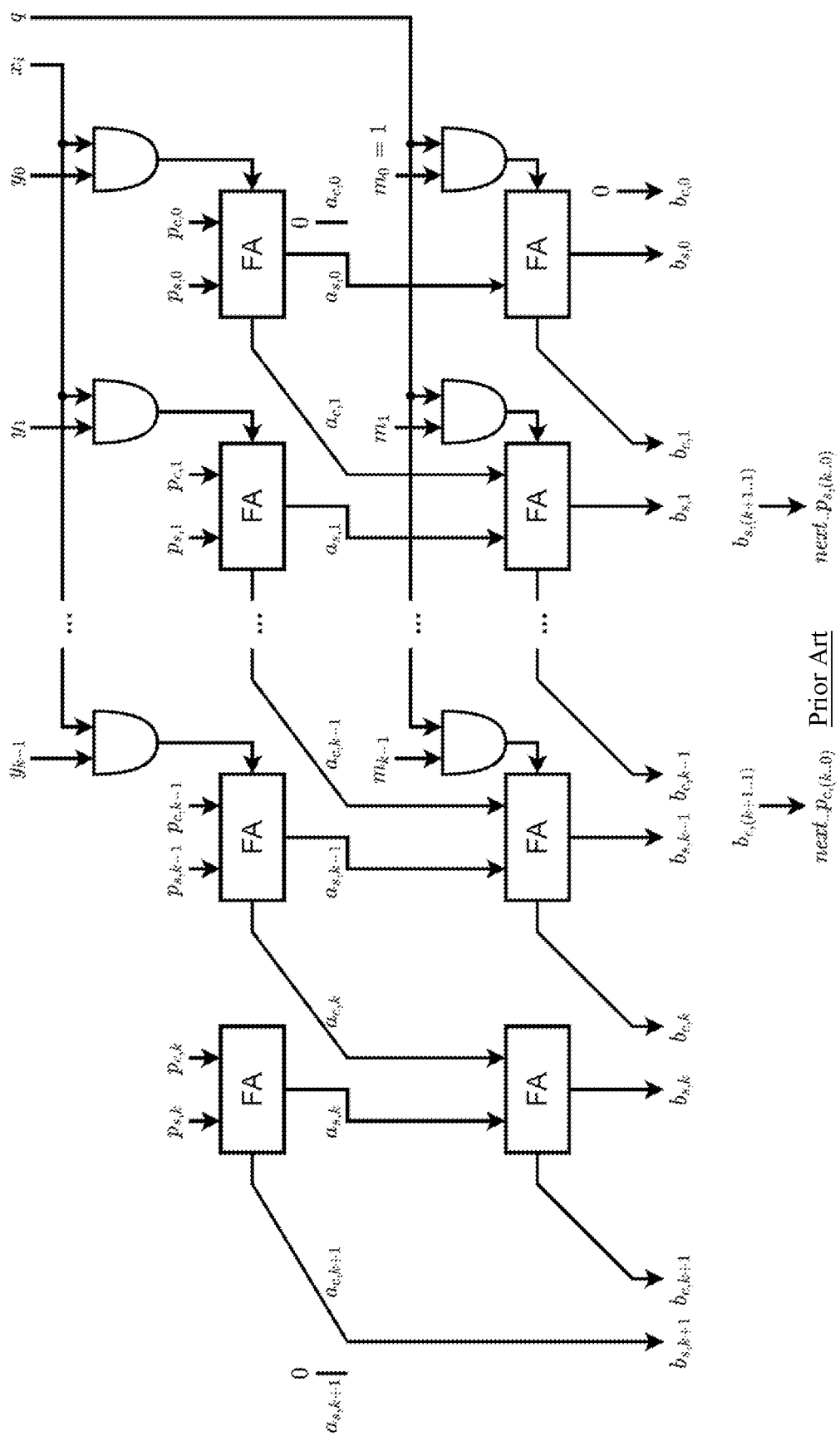
Figure 8B:
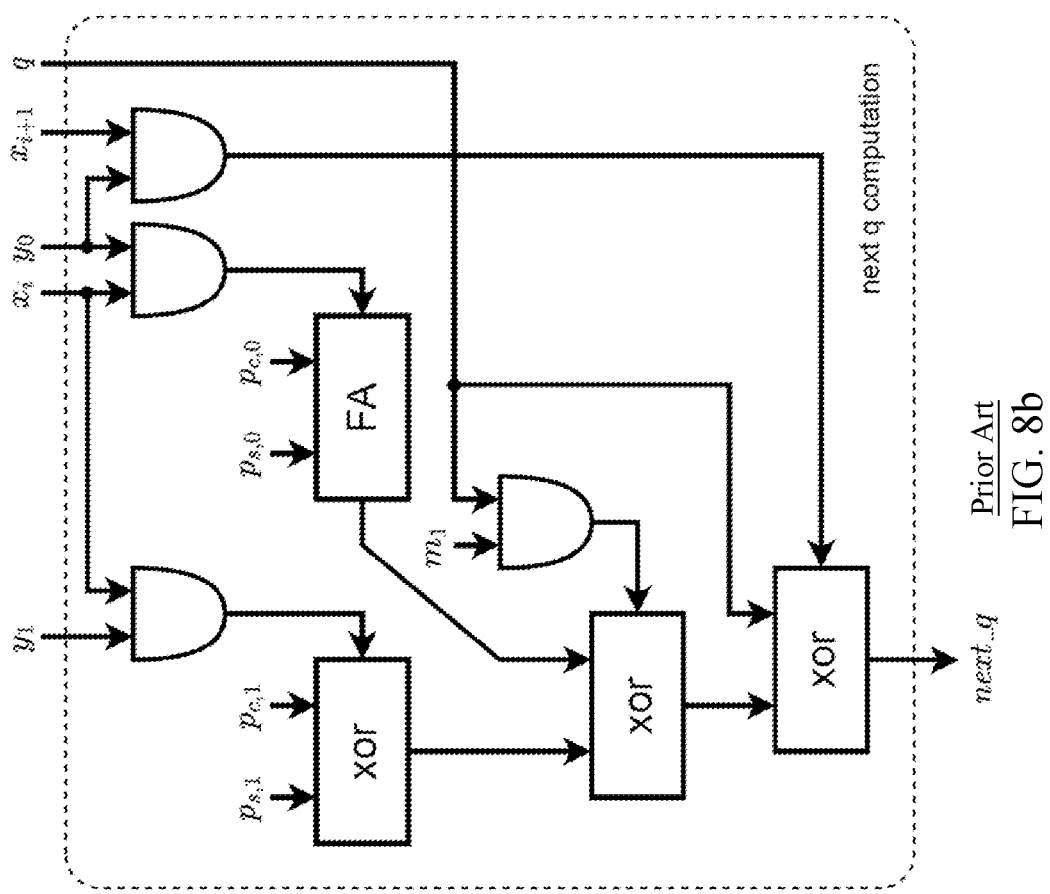

FIGS. 8a-b is a schematic diagram depicting an expanded Montgomery multiplier with digit d=1 as shown in Sutter et al. (supra). This represents the prior art.

Figure 9A:
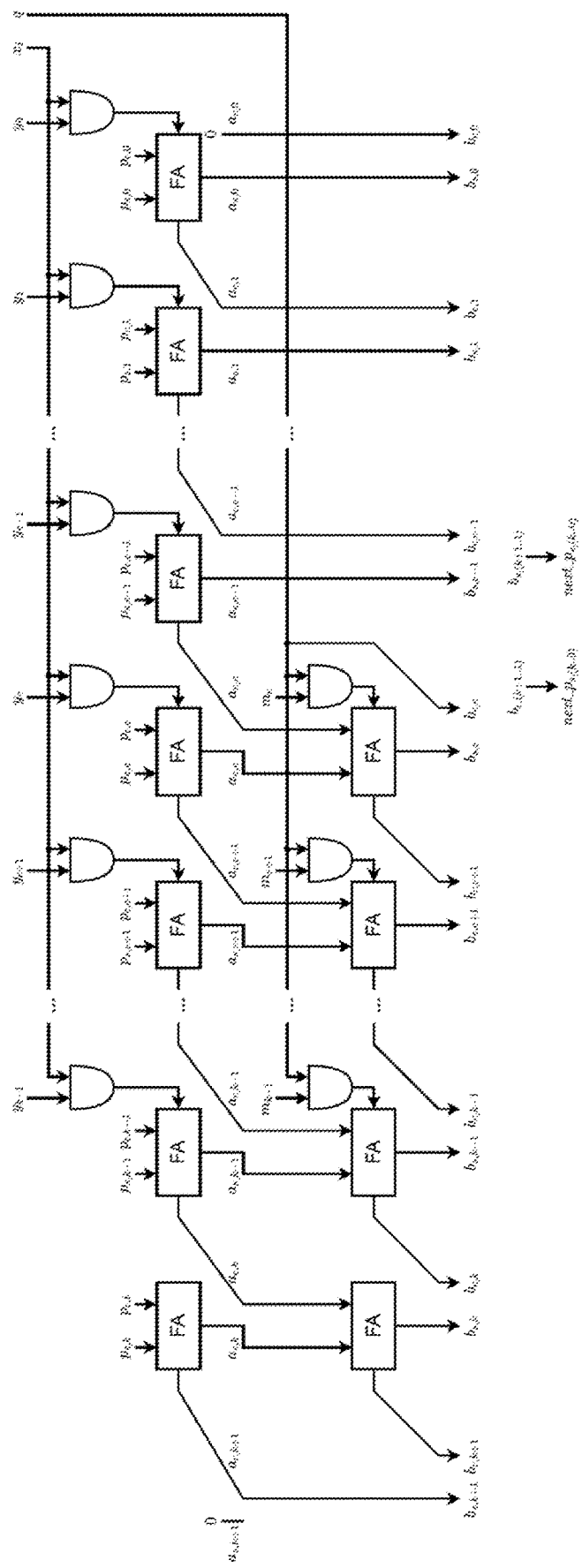
Figure 9B:
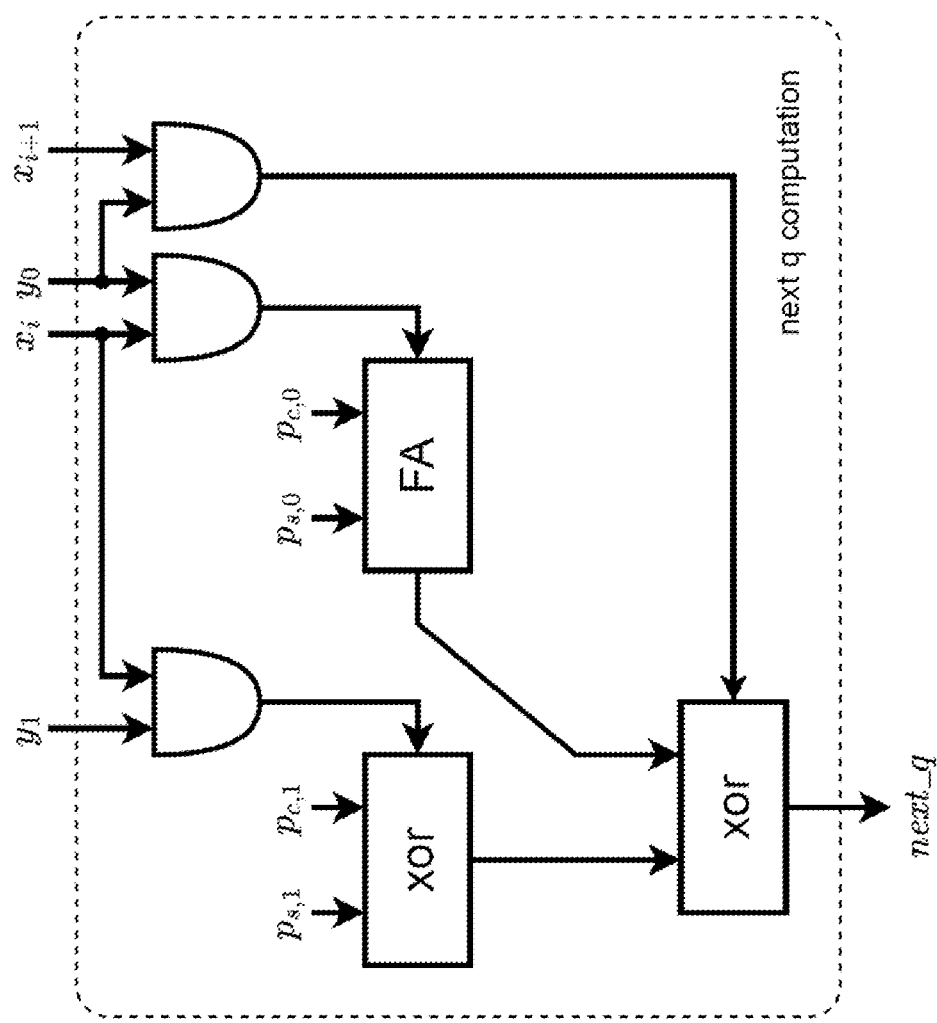
Figure 10A:
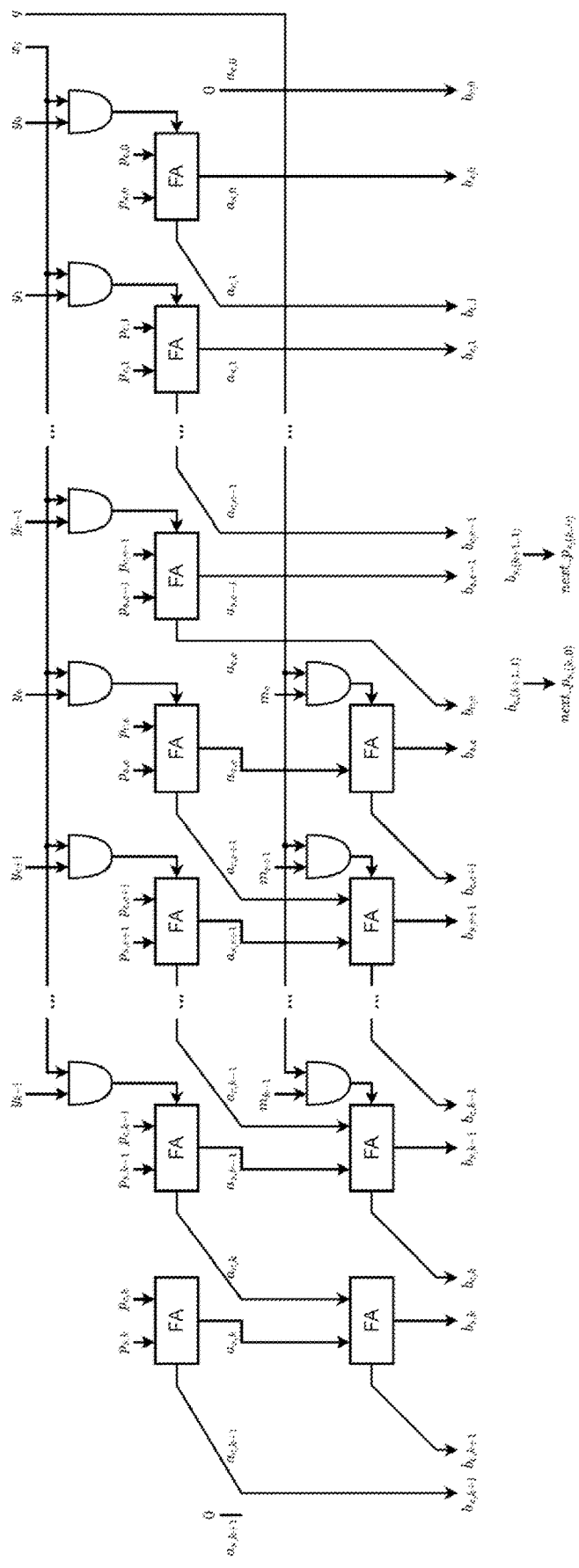
Figure 10B:
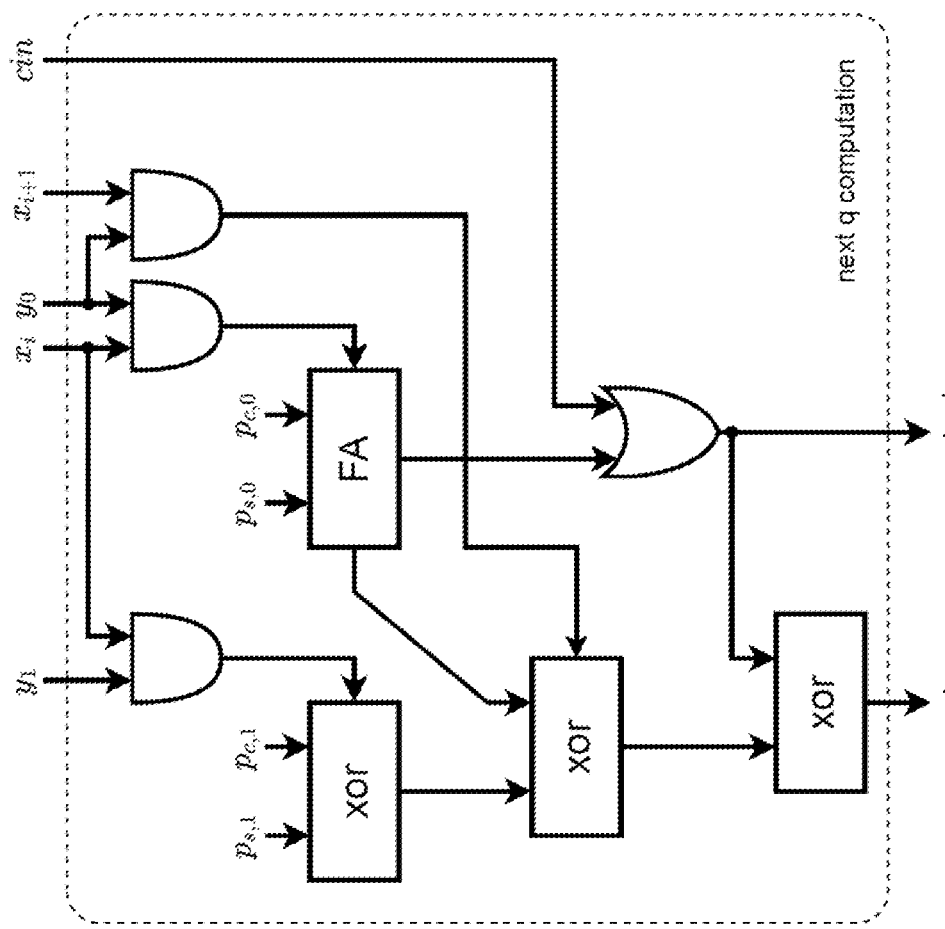

FIGS. 9a-b is a schematic diagram that depicts an expanded processing unit for the invention's Montgomery multiplier with modulus=f·$2^e$−1 and digit d=1. Note that this Montgomery multiplier uses e fewer AND gates and e fewer Full Adders than FIGS. 1a-c in the systolic part. The next_q block also uses 1 fewer AND gate and 1 fewer XOR gate than FIGS. 1a-c, also resulting in a shorter critical path that does not even depend on the previous value of q. The logical bit, q, computed by one Full Adder, two XOR gates, and three AND gates FIGS. 10a-b is a schematic diagram depicts an expanded processing unit for the invention's Montgomery multiplier with modulus=f·$2^e$+1 and digit d=1. Note that this Montgomery multiplier uses an additional signal cin, or carry-in, to save e AND gates and e Full Adders than FIGS. 1a-c in the systolic part. The next_q block then swaps 1 XOR gate for 1 Full Adder when compared to FIGS. 1a-c.

DETAILED DESCRIPTION

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

The present invention provides a novel and efficient hardware, system, implementation, and method for efficiently implementing modular multiplication with modulus m of the form f·$2^e$±1 where f is a constant integer and e is a constant integer greater than 2. The modulus m is k bits long. To illustrate the broadness of the invention, we show different ways to show functionally equivalent circuits in FIGS. 1a-c.

The Montgomery multiplication using carry-save adders for digit d=1 (also called radix in some cases) as was designed in Sutter et al. (supra), is shown in Algorithm 2 as well as FIG. 2. To implement Algorithm 2 in hardware or software, typically a basic logic block is used to show the simplest logical computations necessary.

In FIG. 2, FA stands for Full Adder and computes s a XOR b XOR c_in and c_out (a AND b) OR (cin AND (a XOR b)). Here, a, b, and c_in are inputs and s and c_out are outputs. An AND gate, denoted by the bottom half of an ellipsoid is a two-input gate that outputs '1' only if both inputs are '1', otherwise the output is '0'. This AND gate is the same as a one bit multiplication. An XOR gate is a two-input gate that outputs '1' if exactly one input is '1', otherwise the output is '0'.

FIG. 2, FIG. 3, FIG. 4, FIGS. 5a-b, FIGS. 6a-b, FIG. 7, FIGS. 8a-b, FIGS. 9a-b, and FIGS. 10a-b are all figures that illustrate different ways to perform modular multiplication in a hardware or software system. This is defined in a systolic architecture, which is composed of a multitude of processing elements that are interconnected. There can be a multitude of processing element compositions based on various levels of optimization. FIG. 2, FIG. 3, FIG. 4, FIGS. 5a-b, FIGS. 6a-b, and FIG. 7 perform Montgomery multiplication using a compressed systolic architecture format. For FIG. 2, FIG. 3, and FIG. 4, the general processing element is composed of two Full Adders and two AND gates. This invention focuses on simplifying a number of these general processing elements to smaller processing elements, notably down to one Full Adder and one AND gate when functionally possible. FIGS. 5a-b, FIGS. 6a-b, and FIG. 7 use a larger processing element as multiple iterations of Algorithm 2 are unrolled to perform the Montgomery multiplication. Again, the invention focuses on simplifying the complexity of these processing elements when functionally possible.

When implementing Algorithm 2 in hardware or software, two intermediate storage units of size k+1 are required with one additional storage unit of size 1 bit to store the precomputed q. The quotient q is precomputed and then the value is used to compute the partial products which is stored in the two intermediate registers. The process is repeated k times. Finally, the two intermediate storage units are added together which is the Montgomery multiplication output. FIGS. 8a-b shows an expanded hardware implementation of the algorithm for odd moduli. The circuit on the right precomputes q while the circuit on the left computes the partial products. The top full adder (aka. the one that computes $a_{s,k+1 \ldots 0}$ and $a_{c,k+1 \ldots 0}$) is used to compute pc+ps+x(i)·y and the bottom full adder (aka. the one that computes $b_{s,k+1 \ldots 0}$ and $b_{c,k+1 \ldots 0}$) is used to add q·m to the result. Full adders with 2 inputs are half adders. This is one method to implement the circuit and is not the only method. For example, the first full adder can be used to compute pc+ps+q·m and the second circuit adds x(i)·y.

---

Algorithm 2: CSA Montgomery Multiplication
(as seen in Sutter et al., supra)

---

Input: x, y, m < $2^K$, R = $2^k$, m' = $-m^{-1}$ mod m
Output: x · y · $R^{-1}$ mod m
Begin
1. pc = 0;
2. ps = 0;
3. q = x(i) · y(0);
4. for i in 0 . . . k − 1 loop
5.    $q_n$ = ((pc(1:0) + ps(1:0) + x(i) · y(1:0) + q · m(1:0))/2 + x(i + 1) · y(0)) mod 2;
6.    (pc, ps) = (pc + ps + x(i) · y + q · m)/2;
7.    q = $q_n$;
8. end loop
9. return pc + ps;
End

---

As is shown in Algorithm 2, there are many AND gates to perform x(i)·y and q·m. Specifically, since y and m are at most k bits, we must have 2·k AND gates. One simple optimization is to remove a single AND gate for odd moduli as this bit is set, so the q digit can be piped through for this wire in q·m. Note that if the modulus m is constant in an implementation the AND gates for q·m and the input to the Full Adder can be simplified and removed. This patent disclosure focuses on the general case and shape of primes. Any additional simplification of these gates beyond the claims is covered. The Full Adders are used to reduce the number of inputs in Line 6 of Algorithm 2 from 4 inputs to 2 outputs, which requires two Full Adders. This defines the carry-save nature of the Montgomery multiplication algorithm as Algorithm 2 reduces to a partial sum ps and partial carry pc but does not determine the sum of partial results until Line 9 of Algorithm 2.

This invention focuses on special forms of prime moduli that can simplify this computational hierarchy. Notably, when the modulus is of the form $f \cdot 2^e - 1$ or $f \cdot 2^e + 1$, we can remove many Full Adder and AND gates at the least significant portion of the systolic architecture with special arithmetic tricks targeting that the least significant portion of the modulus will have all bits set.

For a modulus that is k bits long, the prior art implementation utilizes $2 \cdot k + 3$ Full Adders, $2 \cdot k + 4$ AND gates, and 3 XOR gates. For moduli of the form $f \cdot 2^e - 1$, our optimized implementation uses $2 \cdot k + 3 - e$ Full Adders, $2 \cdot k + 4 - e$ AND gates, and 2 XOR gates. Further, our next_q computation block has a smaller critical path as it requires fewer operations to go from input to output. The next_q computation is no longer dependent on the previous q. For moduli of the form $f \cdot 2^e + 1$, our optimized implementation uses $2 \cdot k + 3 - e$ Full Adders, $2 \cdot k + 4 - e$ AND gates, and 3 XOR gates. In the systolic architecture, e AND gates and e Full Adders are saved. Considering some applications like SIDH use primes where e is half the bitlength of the prime, these optimizations, save almost 25% of cost to implement this modular multiplication.

When considering this invention over an arbitrary radix or digit d, there are still many advantages with our design. Here, we unroll each loop to perform d iterations at a time. The space savings still exist here. Digit d=1 is shown in FIG. 2, FIG. 3, and FIG. 4, which uses a variety of Full Adders and AND gates. For higher digit sizes, the Full Adder and AND gates must be replicated to account for more bits to add and multiply. Digit d=2 is shown in FIGS. 5a-b, FIGS. 6a-b, and FIG. 7. In the prior art as is shown in FIGS. 5a-b, each increment in digit size leads to $2 \cdot k + 3$ additional Full Adders, $2 \cdot k + 4$ AND gates, and 3 XOR gates. Similar to the above, for moduli of the form $f \cdot 2^e - 1$, each increment in digit size accounts for $2 \cdot k + 3 - e$ Full Adders, $2 \cdot k + 4 - e$ AND gates, and 2 XOR gates. The critical path for the next_q computation is again smaller. For moduli of the form $f \cdot 2^e + 1$, each increment in digit size leads to $2 \cdot k + 3 - e$ Full Adders, $2 \cdot k + 4 - e$ AND gates, and 3 XOR gates. Thus, for a digit d, this invention saves de AND gates and de Full Adders.

To illustrate the inventive step here, consider performing modular multiplication over the modulus $62207 = 3^5 \cdot 2^8 - 1$. Thus, in this example, $f = 3^5 = 243$, $e = 8$, and $k = 16$. In the below table, we summarize the complexity to implement this in gate operations using the Montgomery multiplication algorithm and iterating over a d bits at a time. Across the board, the proposed invention requires approximately 25% fewer full adders and AND gates.

TABLE 1

Gate complexity of prior art Montgomery multiplication over 62207

| Digit d | #Full Adders | #AND | #XOR |
|---|---|---|---|
| 1 | 35 | 36 | 3 |
| 2 | 70 | 72 | 6 |
| 4 | 140 | 144 | 12 |
| 8 | 280 | 288 | 24 |

TABLE 2

Gate complexity of proposed invention implementing Montgomery multiplication over 62207

| Digit d | #Full Adders | #AND | #XOR |
|---|---|---|---|
| 1 | 27 | 28 | 2 |
| 2 | 54 | 56 | 4 |
| 4 | 108 | 112 | 8 |
| 8 | 216 | 224 | 16 |

As a further example, consider performing modular multiplication over the modulus $10369 = 3^4 \cdot 2^7 - 1$. Thus, in this example, $f = 3^4 = 81$, $e = 7$, and $k = 14$. In the below table, we summarize the complexity to implement this in gate operations using the Montgomery multiplication algorithm and iterating over a d bits at a time. Similar to before, the proposed invention requires approximately 25% fewer full adders and AND gates.

TABLE 3

Gate complexity of prior art Montgomery multiplication over 10367

| Digit d | #Full Adders | #AND | #XOR |
|---|---|---|---|
| 1 | 31 | 32 | 3 |
| 2 | 62 | 64 | 6 |
| 4 | 124 | 128 | 12 |
| 8 | 248 | 256 | 24 |

TABLE 4

Gate complexity of proposed invention implementing Montgomery multiplication over 10367

| Digit d | #Full Adders | #AND | #XOR |
|---|---|---|---|
| 1 | 24 | 25 | 2 |
| 2 | 48 | 50 | 4 |
| 4 | 96 | 100 | 8 |
| 8 | 192 | 200 | 16 |

What is claimed is:

1. A computer processing system compromising:
   at least one accelerator operably configured to:
   compute modular multiplication with a modulus of the form, $m = f \cdot 2^e - 1$, wherein f is any integer, e is any integer greater than 2, and m is k bits long; and
   have a systolic carry-save architecture configured to implement Montgomery multiplication and reduction bit-by-bit, have a processing element for the e least significant bits comprising of one Full Adder and one AND gate, and a processing element for the next significant k−e bits comprising of two Full Adders and two AND gates.

2. The computer processing system according to claim 1, wherein the Montgomery multiplication further comprises:

a logical bit, q, computed by one Full Adder, two XOR gates, and three AND gates, wherein the q is operably configured to be stored and implemented in the processing element for the most significant k−e bits.

3. The computer processing system according to claim 2, wherein:
the q is operably configured to be stored in the systolic carry-save architecture.

4. The computer processing system according to claim 1, wherein:
the modulus is $m=2^{216}3^{137}-1$, $m=2^{250}3^{259}-1$, $m=2^{305}3^{192}-1$, or $m=2^{372}3^{239}-1$.

5. A computer processing system compromising:
at least one accelerator operably configured to:
compute modular multiplication digit-by-digit with a modulus of the form, $m=f\cdot 2e-1$, wherein f is any integer, e is any integer greater than 2, m is k bits long, and a digit, d, is any integer greater than 1; and
have a systolic carry-save architecture configured to implement Montgomery multiplication and reduction digit-by-digit, have a processing element for the CEILING(e/d) least significant digits comprising of d Full Adders and d AND gates, and a processing element for the next significant CEILING((k−e)/d) digits comprising of 2·d Full Adders and 2·d AND gates.

6. The computer processing system according to claim 5, wherein the Montgomery multiplication further comprises:
a logical digit, q, computed by d Full Adders, 2·d XOR gates, and 3·d AND gates.

7. The computer processing system according to claim 5, wherein:
the modulus is $m=2^{216}3^{137}-1$, $m=2^{250}3^{259}-1$, $m=2^{305}3^{192}-1$, or $m=2^{372}3^{239}-1$.

8. A computer processing system compromising:
at least one accelerator operably configured to:
compute modular multiplication with a modulus of the form, $m=f\cdot 2^e+1$, wherein f is any integer, e is any integer greater than 2, and m is k bits long; and
have a systolic carry-save architecture configured to implement Montgomery multiplication and reduction bit-by-bit, have a processing element for the least significant bit comprising of two Full Adders and one AND gate, have a processing element for the next significant e−1 bits comprising of one Full Adder and one AND gate, and a processing element for the next significant k−e bits comprising of two Full Adders and two AND gates.

9. A computer processing system compromising:
at least one accelerator operably configured to:
compute modular multiplication digit-by-digit with a modulus of the form, $m=f\cdot 2^e+1$, wherein f is any integer, e is any integer greater than 2, m is k bits long, and a digit, d, is any integer greater than 1; and
have a systolic carry-save architecture configured to implement Montgomery multiplication and reduction digit-by-digit, have a processing element for the least significant digit comprising of 2·d Full Adders and d AND gates, have a processing element for the CEILING((e−1)/d) for the next significant digits comprising of d Full Adders and d AND gates, and a processing element for the next significant CEILING((k−e+1)/d) digits comprising of 2·d Full Adders and 2·d AND gates.

\* \* \* \* \*